United States Patent [19]
Fabian

[11] Patent Number: 5,351,491
[45] Date of Patent: Oct. 4, 1994

[54] PROCESS FOR OBTAINING HIGH-PURITY HYDROGEN AND HIGH-PURITY CARBON MONOXIDE

[75] Inventor: Rainer Fabian, Geretsried, Fed. Rep. of Germany

[73] Assignee: Linde Aktiengesellschaft, Wiesbaden, Fed. Rep. of Germany

[21] Appl. No.: 39,667

[22] Filed: Mar. 30, 1993

[30] Foreign Application Priority Data

Mar. 31, 1992 [DE] Fed. Rep. of Germany ....... 4210637

[51] Int. Cl.⁵ ............................................. F25J 3/00
[52] U.S. Cl. ............................................. 62/18; 62/38
[58] Field of Search ............................. 62/24, 38, 18

[56] References Cited

U.S. PATENT DOCUMENTS

| | | | |
|---|---|---|---|
| 2,844,944 | 7/1958 | Becker | 62/25 |
| 2,973,628 | 3/1961 | Green et al. | 62/24 |
| 3,813,889 | 6/1974 | Allam et al. | 62/22 |
| 4,217,759 | 8/1980 | Shenoy | 62/38 |
| 4,311,496 | 1/1982 | Fabian | 62/24 |
| 4,478,621 | 10/1984 | Fabian | 62/31 |
| 4,564,816 | 2/1986 | Batta | 55/26 |
| 4,566,886 | 1/1986 | Fabian | 62/23 |
| 4,608,069 | 8/1986 | Becker et al. | 62/26 |
| 5,133,793 | 7/1992 | Billy | 62/25 |

FOREIGN PATENT DOCUMENTS 130284 1/1985 European Pat. Off. .

OTHER PUBLICATIONS

Berninger, Ralph, "Linde Reports on Science and Technology", No. 44, 1988, pp. 18–23.

*Primary Examiner*—Ronald C. Capossela
*Attorney, Agent, or Firm*—Millen, White, Zelano & Branigan

[57] ABSTRACT

An improvement in a process for the production of high-purity hydrogen and high-purity carbon monoxide by the separation of an extensively dry and $CO_2$-free $H_2/CO$ crude gas mixture, also containing methane, by means of pressure swing adsorption and one-stage partial condensation, wherein, the $H_2/CO$ crude gas mixture is subjected to a pressure swing adsorption process, producing a high-purity hydrogen product stream, while the CO-rich gas obtained in the regeneration during the pressure swing adsorption process is compressed, cooled, at least partially condensed, and conducted into a phase separator wherein it is separated into a gaseous $H_2$-rich fraction and a liquid CO-rich fraction, whereupon the gaseous $H_2$-rich fraction is heated and admixed to the $H_2/CO$ crude gas mixture before the latter is fed into the pressure swing adsorption. The improvement is that at least a portion of the liquid CO-rich fraction from the phase separator is at least partially expanded, heated, and conducted into the lower region of a double distillation column having an upper and lower region, a liquid methane fraction being withdrawn from the bottom of the column, a liquid high-purity carbon monoxide product fraction being withdrawn from the lower part of the upper region of the column, and a gaseous CO-rich fraction being withdrawn from the head of the column.

24 Claims, 1 Drawing Sheet

PROCESS FOR OBTAINING HIGH-PURITY HYDROGEN AND HIGH-PURITY CARBON MONOXIDE

BACKGROUND OF THE INVENTION

The invention relates to a process for the production of high purity carbon monoxide, especially a process capable of producing both high-purity hydrogen and high-purity carbon monoxide.

A known process of this type, for example, comprises the separation of an extensively dry, for example, not more than 0.1 mol-ppm $H_2O$, and substantially $CO_2$-free, for example, not more than 0.1 mol-ppm $CO_2$, $H_2/CO$ crude gas mixture, also containing methane in an amount of from 1 mol % to 7 mol %, by means of pressure swing adsorption and one-stage partial condensation, wherein the $H_2/CO$ crude gas mixture is subjected to a pressure swing adsorption process, producing a high-purity hydrogen product stream, while the CO-rich gas obtained by desorption during regeneration in the pressure swing adsorption process is compressed, cooled, at least partially condensed, and conducted into a phase separator wherein it is separated into a gaseous $H_2$-rich fraction and a liquid CO-rich fraction, whereupon the gaseous $H_2$-rich fraction is heated and admixed to the $H_2/CO$ crude gas mixture before the latter is fed into the pressure swing adsorption system.

A number of technical modifications have occurred in recent years in the $H_2/CO$ fractionation art, owing to increased demands for purity of the fractionation products, the increased importance of the operating costs of a facility, and the continuous improvement in the thermodynamic data available.

The $H_2/CO$ crude gas mixture is primarily obtained from steam reforming processes. However, heavy oil gasification with oxygen—i.e., a partial oxidation—has likewise gained significance as a source of $H_2/CO$ crude gas, presupposing an inexpensive oxygen source.

A major portion of the carbon monoxide produced by the process can be utilized in formic and acetic acid production. Another field of use is in polycarbonate chemistry which requires, as a raw material, phosgene of high purity, which requires, in turn, carbon monoxide of maximum purity. The methane content of the carbon monoxide portion here must be lower than 10 mol ppm, the hydrogen content lower than 1000 mol ppm. The hydrogen produced by the process can be used for a great variety of hydrogenation purposes.

An overview regarding the processes being used for manufacturing pure carbon monoxide and pure hydrogen is presented in the article by Dr. Ralph Berninger in "LINDE Reports on Science and Technology" No. 44, 1988, pages 18–23.

One disadvantage of prior processes is that at least two distillation columns are necessary to remove both $H_2$ and $CH_4$ from CO, resulting in a corresponding number of conduits, valves and the concomitant control and regulating devices. This, of course, increases the susceptibility of the process to breakdown or malfunction.

SUMMARY OF THE INVENTION

An object of the present invention is to provide a process of the type discussed above so that the yields of carbon monoxide and hydrogen are increased, with the purity being the same or better, and also with lower investment costs, and lower operating costs, owing particularly to the elimination of one distillation column. The elimination of one distillation column also reduces the required space for the process plant.

Upon further study of the specification and appended claims, further objects and advantages of this invention will become apparent to those skilled in the art.

The above objectives are achieved according to this invention by an improvement of the known process wherein the liquid CO-rich fraction from the phase separator containing, for example, 70 to 90 mol % CO, 5 to 40 mol % $H_2$ and 10 to 20 mol % $CH_4$, is at least partially expanded, heated, and conducted into the lower region of a double distillation column having an upper and lower region, a liquid methane fraction is withdrawn from the bottom of this column, a liquid high-purity carbon monoxide product fraction having, for example, 99.8 to 99.9 mol % CO, 200 to 100 mol-ppm $H_2$ and 1 to 500 mol-ppm $CH_4$, being withdrawn from the lower part of the upper region of this column, and a gaseous CO-rich fraction having, for example, 65 to 80 mol % CO, 20 to 35 mol % $H_2$ and 0.1 to 100 mol-ppm $CH_4$, being withdrawn from the head of this column.

The double distillation column is divided into an upper region and a lower region preferably by a middle chimney plate or chimney tray. The lower part of the upper region is just above the middle chimney plate or chimney tray. There is also preferably a lower chimney plate or chimney tray in the lower part of the lower region. The number of theoretical plates of the upper region is preferably about 5 and the number of theoretical plates of the lower region is preferably about 50. The double distillation column is operated at a pressure in the range of, for example, 4 to 8 bar, the temperature of the upper region being within the range of, for example 90 to 105K and the temperature of the lower region being within the range of, for example, 110 to 130K.

The CO-rich fraction withdrawn from the phase separator is usually heated in heat exchange with process streams to be cooled.

One embodiment of the process according to this invention is characterized in that only a portion, generally 6 to 15%, preferably 8 to 12%, of the total, of the liquid CO-rich fraction from the phase separator is introduced into the double distillation column and another portion, generally 40 to 65%, preferably 50 to 58%, of the total, of the liquid CO-rich fraction is heated and fed to the CO-rich gas from the pressure swing adsorption prior to compression of the latter. Thereby, the process stream conducted to the phase separator can be cooled in indirect heat exchange with the liquid CO-rich fraction and other streams with the result that the temperature of the process stream and thus, the temperature in the separator can be lowered. This, in turn, has the effect that the quantity of CO in the $H_2$-rich fraction withdrawn from the head of the phase separator is reduced. The amount of CO in this $H_2$-rich fraction is generally in the range of from 10 to 20 mol %, preferably 12 to 17 mol %. Since this $H_2$-rich fraction is again admixed to the $H_2/CO$ crude gas mixture, the hydrogen yield of the pressure swing adsorption is increased whereby additionally the compressor work required for the compression of the CO-rich stream introduced into the phase separator is reduced.

Another embodiment of the invention is characterized in that a further portion, generally 8 to 20%, preferably 10 to 18%, of the total, of the liquid CO-rich fraction from the phase separator is expanded, heated in heat exchange with a CO-rich fraction from the upper region of the double distillation column to be cooled and is introduced into the CO-rich gas from the pressure swing adsorption process prior to compression of the latter.

In order to improve the separating properties of the upper region of the double distillation column, a gaseous CO-rich fraction is withdrawn at the upper part of this region. This fraction is cooled in heat exchange with a liquid CO-rich fraction from the phase separator, partially condensed during this step, and then introduced as reflux into the double distillation column at a point lying above the withdrawal point.

In a further embodiment of the process according to this invention, the gaseous CO-rich fraction withdrawn at the head of the double distillation column is expanded, heated, and introduced into the CO-rich gas from the pressure swing adsorption prior to compression of the latter. This embodiment of the process of this invention, on the one hand, raises the carbon monoxide yield and, on the other hand, reduces the need for external colds since the gaseous CO-rich fraction obtained at the head of the double distillation column is heated after its expansion in heat exchange with process streams to be cooled and is subsequently mixed into the CO-rich recycle stream.

A further embodiment of the process according to this invention is characterized in that an even further portion, generally 8 to 17%, preferably 10 to 14%, of the total, of the liquid CO-rich fraction from the phase separator is expanded and conducted as intermediate reflux into the lower region of the double distillation column. In contrast to the portion of the liquid CO-rich fraction from the phase separator, which is expanded, heated, and then conducted, partially vaporized, as the feed into the lower region of the double distillation column, this partial stream of the liquid CO-rich fraction from the phase separator is merely expanded and, thus, almost entirely in the liquid phase, conducted as intermediate reflux into the lower region of the double distillation column, preferably at a position between the entrance of the liquid CO-rich fraction feed to the double distillation column and the lower chimney plate or tray. This embodiment of the process according to the invention reduces the required reflux at the "head" of the lower region of the double distillation column, i.e., the amount of liquid CO-rich fraction from the phase separator, required for condensing the column head reflux, is decreased resulting in less work for the compressor(s) of the process.

In a further development of the process of this invention, the carbon monoxide product fraction withdrawn from the lower part of the upper region of the double distillation column is expanded and fed into a second phase separator. From the head of the second phase separator, a gaseous CO-rich fraction is withdrawn, and from the bottom of the second phase separator, a liquid high-purity carbon monoxide product fraction is removed. By this development, the purity of the carbon monoxide product fraction withdrawn from the lower part of the upper region of the double distillation column is increased. By using the second phase separator, the hydrogen content in the carbon monoxide product stream can be reduced to about one-third of the content in the carbon monoxide product fraction withdrawn from the lower part of the upper region of the double distillation column.

In a further development of the invention, the carbon monoxide product fraction removed from the bottom of the second phase separator is heated in heat exchange with a CO-rich fraction withdrawn from the upper region of the double distillation column to be cooled. This latter fraction is reintroduced as reflux into the double distillation column above its point of withdrawal. Accordingly, the liquid carbon monoxide product stream serves to provide some of the required process cooling. Heating of the carbon monoxide product stream to the discharge temperature is preferably brought about by heat exchange with process streams to be cooled, since this provides the most economical use of energy in the system.

In another development of the process according to this invention, the gaseous CO-rich fraction removed at the head of the second phase separator is expanded, heated, and fed into the CO-rich gas from the pressure swing adsorption before compression of the latter. Since heating of the gaseous CO-rich fraction withdrawn at the head of the second phase separator is brought about in indirect heat exchange with process streams to be cooled, the need for external cold is again reduced, and the carbon monoxide yield of the process is furthermore increased.

The liquid methane fraction withdrawn from the bottom of the double distillation column, exhibiting a methane concentration of, for example, from 75% to 90% is expanded, heated and vaporized in heat exchange with process streams to be cooled, and subsequently removed from the facility as heating gas. The carbon monoxide in an amount of, for example, 25%, preferably 10%, entrained in this fraction represents the sole loss of carbon monoxide in the process according to this invention.

The process according to the invention preferably results in the preparation of an $H_2$ product gas having a concentration of, for example, from 99.8 to 99.999%, preferably 99.9 to 99.99%, and a CO product liquid having a concentration of, for example, from 98.0% to 99.99%, particularly preferably 99.50% to 99.99%.

The entire disclosures of all applications, patents and publications, cited above and below, and of corresponding application German No. P 42 10 637.0, filed Mar. 31, 1992, are hereby incorporated by reference.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

All quantitative data set forth hereinbelow regarding process streams refer to mol-%, where otherwise indicated.

BRIEF DESCRIPTION OF THE DRAWING

Various other objects, features and attendant advantages of the present invention will be more fully appreciated as the same becomes better understood when, considered in conjunction with the accompanying drawing, in which like reference characters designate the same or similar parts throughout the several views, and wherein.

DETAILED DESCRIPTION OF THE DRAWING

Figure 1:
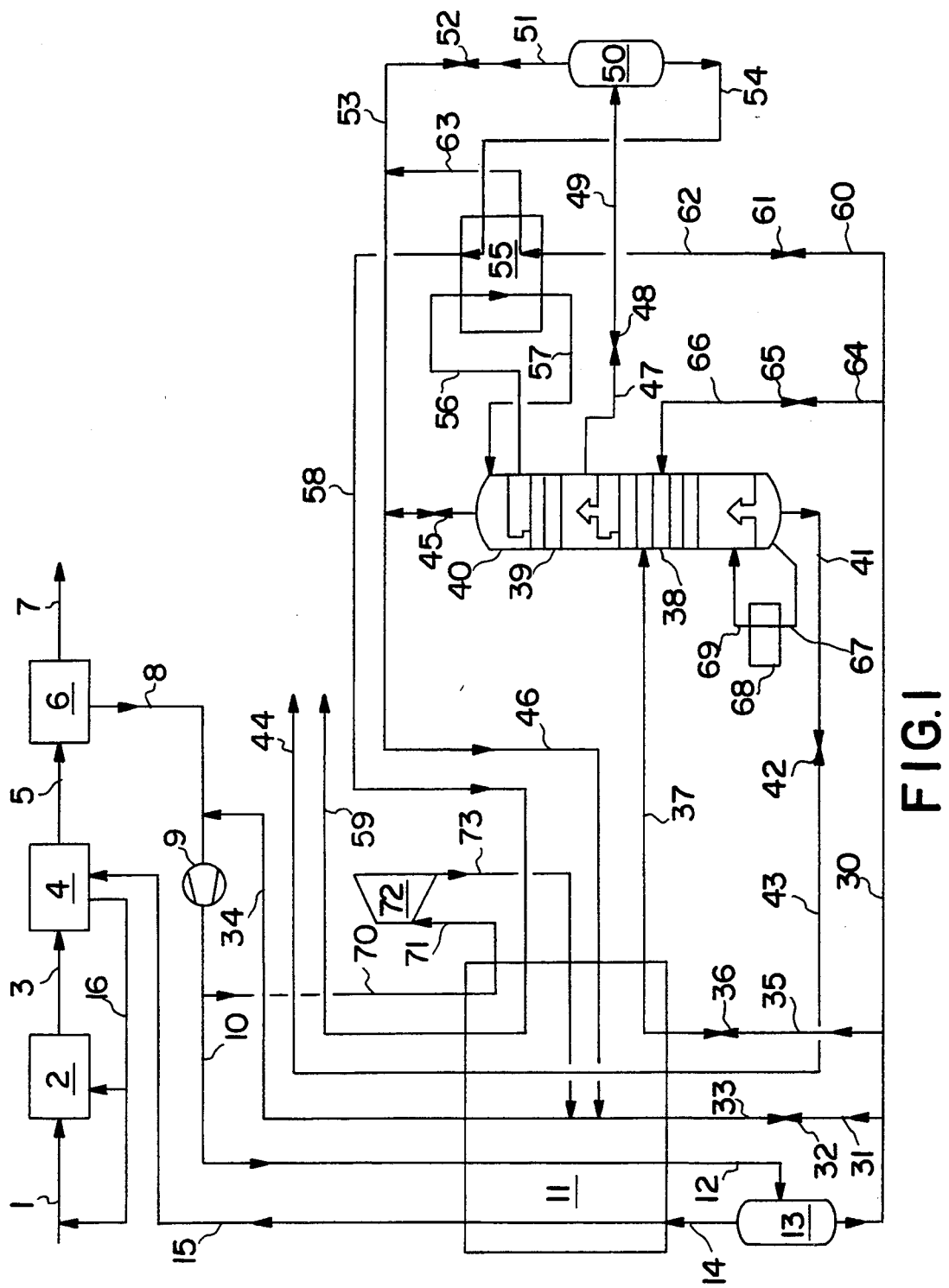
FIG. 1 is a schematic flowsheet of a preferred comprehensive embodiment of the process of the invention.

Via conduit 1, a gaseous crude gas stream, consisting of $H_2$ 65.88%; CO 21.3%; $CH_4$ 4.1%; $CO_2$ 7.5%; and $H_2O$ 1.2%, is introduced at a temperature of 333K and under a pressure of 16.8 bar. The crude gas stream in this case stems from a steam reformer. The crude gas stream is first introduced into a carbon dioxide scrubbing stage 2 and then, via conduit 3, into an adsorption stage 4 wherein the crude gas stream is dried. For the sake of simplicity, the carbon dioxide scrubber 2, the adsorption stage 4, as well as the pressure swing adsorption stage 6 to be described below, from which the high-purity hydrogen is obtained, are illustrated merely schematically. The gaseous stream withdrawn from the adsorption stage 4 via conduit 5 with a temperature of 283K and a pressure of 15.8 bar consists merely of $H_2$ 74.4%; CO 21.9%; and $CH_4$ 3.7%. This stream is then subjected to a pressure swing adsorption step 6 from which a high-purity gaseous hydrogen product fraction is withdrawn via conduit 7 with a temperature of 288K and a pressure of 15.1 bar, now containing merely 5 mol ppm of carbon monoxide. A 5-adsorber process with two successive pressure equalizing steps is preferably utilized as the pressure swing adsorption method—as described, for example, in U.S. Pat. No. 3,564,816. While hydrogen represents the component lending itself less to adsorption, carbon monoxide and methane are adsorbed and thereafter desorbed by means of pressure reduction. For a complete cleaning of the adsorbers, purging of the latter is provided with a portion of the hydrogen product fraction, prior to repressurizing with the crude gas stream. The gas obtained during the desorption steps thus consists substantially of carbon monoxide, methane, and hydrogen. Since the pressure ratio of adsorption pressure/desorption pressure should range at about 7 to 8, the adsorption pressure range is chosen to be between 12 and 30 bar, and the desorption pressure range to be between 1.5 and 3.5 bar. In this connection, care must be taken that the selected desorption pressures lies within the intake pressure of the compressor 9.

By way of conduit 8, with a temperature of 278K and a pressure of 2.0 bar, the purge gas obtained during regeneration of the pressure swing adsorption facility 6 is withdrawn, mixed with the CO-rich recycle gas—described in greater detail below—consisting of $H_2$ 37.8%; CO 53.5%; and $CH_4$ 8.9%, and is fed to compressor 9. The compressor 9 at this location serves as the stand-in for a 2- or 3-stage compression process from 2.0 to 18.3 bar. The number of compression steps will be discussed in detail below. However, between the individual compression steps, cooling of the previously compressed gaseous stream is in each case performed. The CO-rich gas, now compressed to 18.3 bar, is conducted with a temperature of 310K in conduit 10 through the heat exchanger 11 and, in the latter, cooled, in heat exchange with process streams to be heated, to a temperature of 90K. In order to provide the required cooling in heat exchanger 11, it is optionally possible to use, besides the process streams to be heated, additionally liquid nitrogen (not illustrated in the figure).

The cooled CO-rich gas is introduced via conduit 12 into phase separator 13. At the head of the phase separator 13, a gaseous $H_2$-rich fraction is withdrawn with a temperature of 90K and a pressure of 17.4 bar via conduit 14; this fraction consists of $H_2$ 84.1%; CO 15.6%; and $CH_4$ 0.3%. This fraction is heated in heat exchanger 11 in heat exchange with process streams to be cooled, introduced first as regenerating gas into the adsorptive drying stage 4 via conduit 15, and subsequently fed via conduit 16 either into the carbon dioxide scrubber 2 and admixed with the crude gas stream and/or admixed to the crude gas stream 1 before the latter enters the carbon dioxide scrubber 2.

A liquid CO-rich fraction consisting of $H_2$ 3.1%; CO 82.6%; and $CH_4$ 14.3% is withdrawn from the bottom of the phase separator 13 with a temperature of 90K and a pressure of 17.4 bar via conduit 30. A first portion of this CO-rich fraction is introduced into valve 32 via conduit 31, expanded in the valve to the pressure exhibited by the CO-rich gas in conduit 8, and then fed to heat exchanger 11 via conduit 33. This portion of the CO-rich fraction from separator 13, denoted hereinbelow as the CO-rich recycle stream, yields the peak cold necessary for the process during its vaporization in heat exchanger 11. After its vaporization in heat exchanger 11, this portion is readmixed via conduit 34 to the CO-rich gas in conduit 8.

A further portion of the liquid CO-rich fraction from phase separator 13 is fed to the valve 36 via conduit 35. In the valve, the portion is expanded to a pressure of 6.2 bar and subsequently conducted, via conduit 37, after having been heated in heat exchanger 11 to a temperature of 114K, into the lower region 38 of the double distillation column 40. The double distillation column 40 is divided into a lower region 38 and an upper region 39. From the bottom of the double distillation column 40, a liquid $CH_4$-rich fraction is removed at a temperature of 125K and under a pressure of 6.1 bar via conduit 41, this fraction consisting of CO 14.0% and $CH_4$ 86.0%. This fraction is expanded in valve 42 to a pressure of 1.8 bar and then fed into heat exchanger 11 via conduit 43. In this heat exchanger, the $CH_4$-rich fraction is heated to a temperature of 307K in heat exchange with process streams to be cooled, and subsequently discharged as heating gas via conduit 44.

At the head of the double distillation column, a gaseous CO-rich fraction consisting of $H_2$ 27.8% and CO 72.2% is withdrawn with a temperature of 96K and a pressure of 5.9 bar, expanded in valve 45 to the pressure of the CO-rich gas in conduit 8, heated in heat exchanger 11 in heat exchange with process streams to be cooled, and admixed to the CO-rich recycle stream.

With the temperature of 101K and a pressure of 5.9 bar, a liquid carbon monoxide product fraction is withdrawn via conduit 47 from the lower part of the upper region of the double distillation column 40. This fraction now contains merely 500 mol ppm of $H_2$ and 5 mol ppm of $CH_4$. This fraction is expanded in valve 48 to a pressure of 4.7 bar and fed via conduit 49 into a second phase separator 50. At the head of the phase separator 50, a gaseous CO-rich fraction is removed via conduit 51 with a temperature of 98K and a pressure of 4.7 bar, expanded in valve 52 to the pressure of the CO-rich gas in conduit 8, and introduced into the CO-rich recycle gas via conduits 53 and 46. The liquid high-purity carbon monoxide product fraction, now containing merely 200 mol ppm of $H_2$ and 5 mol ppm of $CH_4$, withdrawn at the bottom of the phase separator 50 with a temperature of 98K and a pressure of 4.7 bar, is introduced via conduit 54 into a heat exchanger 55. In the latter, the fraction is heated in heat exchange with a gaseous CO-rich fraction 56 withdrawn in the upper region 39 of the double distillation column 40 and reintroduced into the double distillation column 40 via conduit 57 above its withdrawal point. Subsequently, the carbon monoxide product fraction is fed into the heat exchange 11 via conduit 58, heated in this heat exchanger in heat exchanger with process streams to be cooled to the desired delivery temperature, and removed via conduit 59 as a high-purity carbon monoxide product. Since the cooling from the carbon monoxide product fraction conducted through the heat exchanger 55 is usually insufficient for condensing the CO-rich fraction withdrawn from the head of the double distillation column 40, a further portion of the liquid CO-rich fraction from phase separator 13 is introduced via conduit 60, expanded in valve 61, conducted into the heat exchanger 55 via conduit 62, heated in the heat exchanger, and then fed via conduits 63, 53 and 46 to the CO-rich recycle stream.

In order to reduce the required head cooling and bottom heating of the double distillation column 40, a further portion of the liquid CO-rich fraction from phase separator 13 is introduced into valve 65 via conduit 64 and, after expansion has taken place, introduced as intermediate reflux via conduit 66 into the double distillation column 40. Furthermore, a portion of the $CH_4$-rich fraction is withdrawn from the bottom of the double distillation column 40 via conduit 67, vaporized in heat exchanger 68, and then reintroduced into the double distillation column 40 via conduit 69 above its withdrawal point.

In addition to making cooling available by means of liquid nitrogen, as mentioned above, it is also possible to provide the cooling needed additionally for the process of this invention by the refrigeration-producing expansion of a partial stream of the compressed CO-rich gas. As mentioned above, compression of the CO-rich gas takes place in compressor 9 in two or three stages respectively with subsequent cooling of the previously compressed gas. In correspondence with the size of the facility wherein the process of this invention is being used, a partial stream of the compressed CO-rich gas is branched off after the second or third compressor stage—illustrated by conduit 70 in the figure—conducted into the heat exchanger 11, and cooled in heat exchange with process streams to be heated. Subsequently thereto, the cooled gaseous stream is conducted via conduit 71 into the expansion turbine 72, expanded with production of refrigeration, and conducted via conduit 73 through the heat exchanger 11 to the CO-rich recycle stream.

The preceding example can be repeated with similar success by substituting equivalent reactants and/or operating conditions for those used in the preceding example.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the production of high-purity hydrogen and high-purity carbon monoxide by the separation of an extensively dry and $CO_2$-free $H_2/CO$ crude gas mixture, also containing methane, by means of pressure swing adsorption and one-stage partial condensation, wherein, the $H_2/CO$ crude gas mixture is subjected to a pressure swing adsorption process, producing a high-purity hydrogen product stream, while the CO-rich gas obtained in the regeneration during the pressure swing adsorption process is compressed, cooled, at least partially condensed, and conducted into a phase separator wherein it is separated into a gaseous $H_2$-rich fraction and a liquid CO-rich fraction, whereupon the gaseous $H_2$-rich fraction is heated and admixed to the $H_2/CO$ crude gas mixture before the latter is fed into the pressure swing adsorption, the improvement wherein:

at least a portion of the liquid CO-rich fraction from the phase separator is at least partially expanded, heated, and conducted into the lower column of a double distillation column having an upper and lower column, a liquid methane fraction being withdrawn from the bottom of the lower column, a liquid high-purity carbon monoxide product fraction being withdrawn from the lower part of the upper column, and a gaseous CO-rich fraction being withdrawn from the head of the upper column.

2. The process of claim 1, wherein a portion of the liquid CO-rich fraction from the phase separator is heated and introduced into the CO-rich gas from the pressure swing adsorption process prior to its compression.

3. The process of claim 1, wherein a portion of the liquid CO-rich fraction from the phase separator is expanded, heated in heat exchange with a CO-rich fraction from the upper column of the double distillation column and introduced into the CO-rich gas from the pressure swing adsorption process prior to its compression.

4. The process of claim 3, wherein the CO-rich fraction from the upper column of the double distillation column is, after being cooled in heat exchange, introduced as reflux into the double distillation column above its withdrawal point.

5. The process of claim 1, wherein the gaseous CO-rich fraction withdrawn at the head of the upper column of the double distillation column is expanded, heated, and introduced into the CO-rich gas from the pressure swing adsorption process prior to its compression.

6. The process of claim 1, wherein a portion of the liquid CO-rich fraction from the phase separator is expanded and introduced as intermediate reflux into the lower column of the double distillation column.

7. The process of claim 1, wherein the carbon monoxide product fraction withdrawn from the lower part of the upper column of the double distillation column is expanded and introduced into a second phase separator, a gaseous CO-rich fraction is withdrawn from the head of said second phase separator, and a liquid high-purity carbon monoxide product fraction is withdrawn from the bottom of said second phase separator.

8. The process of claim 7, wherein the carbon monoxide product fraction withdrawn from the bottom of the second phase separator is heated in heat exchange with a CO-rich fraction withdrawn from the upper column of the double distillation column.

9. The process of claim 8, wherein the CO-rich fraction from the upper column of the double distillation column is, after being cooled in heat exchange, introduced as reflux into the double distillation column above its withdrawal point.

10. The process of claim 7, wherein the gaseous CO-rich fraction withdrawn at the head of the second phase separator is expanded, heated, and introduced into the CO-rich gas from the pressure swing adsorption process prior to its compression.

11. The process of claim 1, wherein the high-purity hydrogen product comprises at least 99.8 mol % of $H_2$.

12. The process of claim 1, wherein the high-purity carbon monoxide product comprises at least 98 mol % of CO.

13. The process of claim 1, wherein the double distillation column is separated into the upper column and lower column by a middle chimney plate or chimney tray, the lower column has a chimney plate or tray below the lowest plate therein, the upper column has about 5 theoretical plates, the lower column has about 50 theoretical plates, the temperature in the upper column is 90 to 105K., the temperature in the lower column is 110 to K., 130K., and the double distillation column is operated at a pressure of 4 to 8 bar.

14. The process of claim 1, wherein the upper and lower columns of the double distillation column are separated by a middle chimney plate or chimney tray, the upper and lower columns each have a plurality of plates therein and the liquid high-purity carbon monoxide product fraction withdrawn at lower part of the upper column is withdrawn at a point between the middle chimney plate or chimney tray and the lowest plate in the upper column.

15. A process for the production of high-purity carbon monoxide which comprises feeding a feed stream comprising 10 to 60 mol % of CO, 30 to 80 mol % of $H_2$ and 2 to 10 mol % of $CH_4$ into the lower column of a double distillation lower column having an upper and lower region, a liquid methane fraction being withdrawn from the bottom of the lower column, a liquid high-purity carbon monoxide product fraction being withdrawn from the lower part of the upper column, and a gaseous CO-rich fraction being withdrawn from the head of the upper column.

16. The process of claim 15, wherein the gaseous CO-rich fraction withdrawn at the head of the upper column of the double distillation column is expanded, heated, and recycled such that at least a portion of the fraction comprises at least a portion of the feed stream.

17. The process of claim 15, wherein an intermediate reflux stream having the same mol % composition as the feed stream is introduced as intermediate reflux into the lower column of the double distillation column.

18. The process of claim 15, wherein the carbon monoxide product fraction withdrawn from the lower part of the upper column of the double distillation column is expanded and introduced into a phase separator, a gaseous CO-rich fraction is withdrawn from the head of said phase separator, and a liquid high-purity carbon monoxide product fraction is withdrawn from the bottom of said phase separator.

19. The process of claim 18, wherein the carbon monoxide product fraction withdrawn from the bottom of the phase separator is heated in heat exchange with a CO-rich fraction withdrawn from the upper column of the double distillation column.

20. The process of claim 18, wherein the gaseous CO-rich fraction withdrawn at the head of the phase separator is expanded, heated, and recycled such that at least a portion of the fraction comprises at least a portion of the feed stream.

21. The process of claim 15, wherein a CO-rich fraction from the upper region of the double distillation column is withdrawn, is cooled by heat exchange and is introduced as reflux into the double distillation column above its withdrawal point.

22. The process of claim 15, wherein the high-purity carbon monoxide product comprises at least 98 mol % of CO.

23. The process of claim 15, wherein the double distillation column is separated into the upper column and lower column by a middle chimney plate or tray, in its lower part, the upper column has about 5 theoretical plates, the lower column has about 50 theoretical plates, the temperature in the upper column is 90 to 105K., the temperature in the lower column is 110 to 130K., and the double distillation column is operated at a pressure of 4 to 8 bar.

24. The process of claim 15, wherein the upper and lower columns of the double distillation column are separated by a middle chimney plate or chimney tray, the upper and lower columns each have a plurality of plates therein and the liquid high-purity carbon monoxide product fraction withdrawn at the lower part of the upper column is withdrawn at a point between the middle chimney plate or chimney tray and the lowest plate in the upper column.

* * * * *